United States Patent [19]

Volodko et al.

[11] 4,221,873

[45] Sep. 9, 1980

[54] METHOD FOR PRODUCING PHENOL FOAM PLASTIC

[76] Inventors: Leonid V. Volodko, ulitsa Chervyakova, 4, kv.99; Mikhail A. Ksenofontov, ulitsa Korzhenevskogo, 1, korpus 1, kv. 135; Ljudmila E. Ostrovskaya, ulitsa Tikhotskogo, 50, korpus 2, kv. 158; Galina G. Dzivitskaya, ulitsa Kuznechnaya, 52, kv. 352.; Igor D. Goretsky, ulitsa L. Karastoyanovoi, 13, kv. 49; Vasily M. Khoruzhy, ulitsa Brestskaya, 78, kv. 6; Nikolai M. Denisjuk, ulitsa Tolbukhina, 12, kv. 38; Anatoly Y. Volokh, ulitsa Kalinina, 19, kv. 14; Oleg N. Pogorelsky, ulitsa Serova, 3a, kv.3, all of Minsk, U.S.S.R.

[21] Appl. No.: 896,814

[22] Filed: Apr. 17, 1978

[51] Int. Cl.$^2$ .............................................. C08J 9/08
[52] U.S. Cl. .................... 521/103; 521/117; 521/123; 521/136; 521/181; 521/913; 528/144; 528/147; 528/155
[58] Field of Search .................. 260/2.5 F; 521/181, 521/103, 117

[56] References Cited

U.S. PATENT DOCUMENTS

| | | | |
|---|---|---|---|
| 2,323,831 | 7/1943 | Menger et al. | 521/181 |
| 2,891,017 | 6/1959 | Kern et al. | 521/181 |
| 2,912,391 | 11/1959 | Hardy et al. | 521/181 |
| 2,933,461 | 4/1960 | Mullen | 260/2.5 F |
| 3,062,682 | 11/1962 | Morgan et al. | 521/181 |
| 3,150,108 | 9/1964 | Vieli | 521/181 |
| 3,393,161 | 7/1968 | Avis et al. | 521/188 |
| 3,963,650 | 6/1976 | Ogden | 521/181 |
| 4,033,910 | 7/1977 | Papa | 260/2.5 F |

*Primary Examiner*—Morton Foelak
*Attorney, Agent, or Firm*—Lackenbach, Lilling & Siegel

[57] ABSTRACT

A method for producing a phenol foam plastic, consisting in that polycondensation of phenols with formaldehyde is conducted with simultaneous foaming and curing in the presence of a foaming agent and an acid or alkaline catalyst. Used as the phenols are pyrocatechol, hydroquinone, resorcinol, 5-methyl resorcinol, shale alkyl resorcinols, shale total phenols, or various combinations of said phenols. The method is simple and permits obtaining a foam plastic with improved physicomechanical properties.

7 Claims, No Drawings

4,221,873

METHOD FOR PRODUCING PHENOL FOAM PLASTIC

FIELD OF THE INVENTION

The present invention relates to methods for producing phenol foam plastics. The phenol foam plastic produced according to the invention can be used as a heat-insulating material in construction, ship building, machine building, chemical industry, and refrigerating engineering.

DESCRIPTION OF THE PRIOR ART

Known in the art is a method for producing a phenol foam plastic by mixing resol phenol-formaldehyde resin with a foaming agent and an acid catalyst. In this case, foaming and curing of the mixture take place after a certain period of time (1.5 to 10 minutes).

A serious disadvantage of the prior art method is the necessity to obtain, in advance, the resol phenol-formaldehyde resin. This resin is produced in several stages, namely:

(1) polycondensation of phenols with formaldehyde in the presence of a catalyst, at elevated temperatures (75 to 90° C.), for a long period of time (1.5 to 3 hours);

(2) cooling and neutralization of the resulting product;

(3) separation of the resin, e.g., by vacuum distillation.

To produce a resol phenol-formaldehyde resin takes much time, requires special equipment, consumes much heat and labor, while the storage life of resol phenol-formaldehyde resin is limited (up to 2 to 4 months and, at high temperatures, up to a month).

When a phenol foam plastic is produced on the basis of said resin, curing takes a long period of time (1.5 to 10 minutes) and requires an acid catalyst.

The physico-mechanical properties of the phenol foam plastic produced by the prior art method are not sufficiently high, for example:

apparent density, kg/cu.m    50–100
stress at 10% linear compression strain, kgf/sq.cm  0.5–2.0
sorption moisture content after 24 hours of exposure to air with a relative humidity of 98±2%, % by mass  25–20
heat-conductivity coefficient at 20±5° C., kcal/m.h.°C.  0.035–0.040

SUMMARY OF THE INVENTION

It is an object of the present invention to provide a simple method for producing a phenol foam plastic.

Another object of the invention is to provide a method permitting a phenol foam plastic with improved physico-mechanical properties to be obtained.

With these and other objects in view, the invention resides of a method for producing a phenol foam plastic, consisting of polycondensation of phenols with formaldehyde conducted simultaneously with foaming and curing in the presence of a foaming agent and an acid or alkaline catalyst, the phenols being pyrocatechol, hydroquinone, resorcinol, 5-methyl resorcinol, shale alkyl resorcinols, shale total resorcinols, or various combinations of said phenols.

Owing to:

(1) the use of the above phenols;

(2) the introduction of a foaming agent into the starting mixture of monomers; and (3) the introduction of an acid or alkaline catalyst into the starting mixture of monomers, it has become possible to conduct the processes of polycondensation, foaming and curing in a single stage.

The proposed method for producing a phenol foam plastic is quite simple. The necessity to obtain an intermediate product, i.e., resol phenol-formaldehyde resin, is ruled out, hence, no special equipment is required to produce it. In addition, the method can be carried out in a broad temperature range (from 10° to 90° C.) within a much shorter period of time (from 5 to 60 seconds). The above factors permit the production of a phenol foam plastic to be substantially intensified.

In the proposed method, the process of curing can be conducted in the presence of both an acid and alkaline catalyst (said catalyst serves, at the same time, as the polycondensation catalyst). In the latter case, an acid-free phenol foam plastic is produced, which contributes to its low corrosion activity.

The phenol foam plastic produced by the proposed method features improved physico-mechanical characteristics, namely:

apparent density, kg/cu.m    50–100
stress at 10% linear compression strain, kgf/sq.cm  1.0–6.3
heat-conductivity coefficient at 20±5° C., kcal/m.h.°C.  0.031–0.037
sorption moisture content after 24 hours of exposure to air with a relative humidity of 98±2%, % by mass  24.0–1.0
water absorption during 24 hours, % by volume  34.0–4.1.

It is expedient to use, in the proposed method, shale alkyl resorcinols of the following composition (% by weight):

| 5-methyl resorcinol | 46–58 |
|---|---|
| 2,5-dimethyl resorcinol | 9–12 |
| 4,5-dimethyl resorcinol | 10–12 |
| 5-ethyl resorcinol | 10–12 |
| other alkyl resorcinols | 13–18, | or shale total resorcinols of the following composition (% by weight):

| 5-methyl resorcinol | 25.4–29.4 |
|---|---|
| 4,5-dimethyl resorcinol | 8.0–10.8 |
| 5-ethyl resorcinol | 7.5–9.5 |
| 2,5-dimethyl resorcinol | 5.4–7.0 |
| monohydric phenols | 1.0–11.4 |
| resorcinol | 1.6–2.6 |
| 4-methyl resorcinol | 1.2–2.0 |
| 5-n-propyl resorcinol | 1.2–1.8 |
| 2-methyl resorcinol | 1.0–1.4 |
| 4,6-dimethyl resorcinol | 0.8–1.0 |
| 5-n-butyl resorcinol | 0.5–0.7 |
| other alkyl resorcinols | 34.0–34.8 |

With a view to intensifying the process of foaming and obtaining a more structurally homogeneous foam plastic, the polycondensation together with foaming and curing should preferably be conducted in the presence of a non-ionic surfactant in an amount of 1 to 5% of the weight of the starting phenols.

In order to enhance the mechanical strength of the phenol foam plastic, the polycondensation together with foaming and curing should advisably be conducted in the presence of powdered boron in an amount of 1 to 5% of the weight of the starting phenols.

To reduce the sorption moisture content and minimize water absorption of the desired foam plastic, the polycondensation together with foaming and curing should preferably be conducted in the presence of polyvinyl alcohol taken in an amount of 1 to 2% of the weight of the starting phenols, or in the presence of polyethylene glycol taken in an amount of 0.5 to 2.5% of the weight of the starting phenols.

DETAILED DESCRIPTION OF THE INVENTION

The proposed method for producing a phenol foam plastic is realized as follows:

Phenols (pyrocatechol, hydroquinone, resorcinol, 5-methyl resorcinol, shale alkyl resorcinols, shale total phenols, or various combinations of these phenols) are introduced into a 34–40% aqueous solution of formaldehyde. The resulting mixture is thoroughly stirred till complete dissolution of the phenols occurs. Then, introduced into the solution is a foaming agent and, if necessary, the appropriate additives, namely: a non-ionic surfactant, powdered boron, polyvinyl alcohol, polyethylene glycol. The mixture is thoroughly stirred, and an acid or alkaline catalyst is added thereto. The above components may be mixed simultaneously, or in any other sequence, in a broad temperature range (from 10° to 60° C.).

After all the components have been mixed, spontaneous heating of the mixture begins with simultaneous polycondensation, foaming and curing, which processes are over in 5 to 60 seconds.

The shale alkyl resorcinols and shale total phenols used in the proposed method are products of processing oil shales. The composition of the shale alkyl resorcinols and shale total phenols used in the method may vary according to the oil shale deposits and the techniques of processing shales, which, however, does not in any way affect the proposed method and properties of the end product.

Mineral and organic acids, as well as acid salts, may be used as the acid catalyst.

As the alkaline catalyst, use may be made, for example, of an alkali metal hydroxide.

As the foaming agent, a number of compounds can be used, such as: carbonates and bicarbonates of alkali metals, alkali-earth metals and ammonium; powders of metals standing, in the electromotive series, higher than hydrogen; and liquids boiling or vigorously evaporating at temperatures below 80° C.

As the surfactants, non-ionic surface-active agents are used such as cellulose esters, silicone oils, and products of treatment of alkyl phenols with ethylene oxide.

For a better understanding of the invention, the following examples of its practical embodiment are given by way of illustration. The properties of the phenol foam plastic produced according to each example are listed in the table following the examples.

Example 1

100 parts by weight of resorcinol are mixed, at 20° C., with 100 parts by weight of a 34% aqueous solution of formaldehyde, 2 parts by weight of calcium carbonate, and 2 parts by weight of polyhydroxy ethylene ester of iso-octyl phenol, of the following formula: $C_8H_{17}-C_6H_4-O(CH_2CH_2O)_{n-1}-CH_2CH_2OH$, where $n=7$. As the resulting mixture is being stirred, added thereto are 50 parts by weight of sulfuric acid having a specific gravity of 1.12. After said components have been mixed, the processes of polycondensation, foaming and curing are conducted simultaneously to yield a phenol foam plastic. It takes 15 seconds for the foam plastic to form.

Example 2

100 parts by weight of pyrocatechol are mixed, at 18° C., with 100 parts by weight of a 34% aqueous solution of formaldehyde, 1 part by weight of the surfactant of Example 1, and 3 parts by weight of powdered aluminum. Added to the resulting mixture, with stirring, are 80 parts by weight of sulfuric acid having a specific gravity of 1.49. After said components have been mixed, the processes of polycondensation, foaming and curing are conducted simultaneously to yield a phenol foam plastic.

Example 3

100 parts by weight of 5-methyl resorcinol are mixed, at 15° C., with 100 parts by weight of a 34% aqueous solution of formaldehyde and 20 parts by weight of a liquid foaming agent, namely, isopentane. Added to the resulting mixture, with stirring, are 50 parts by weight of sulfuric acid having a specific gravity of 1.52. As a result, a phenol foam plastic is obtained.

Example 4

100 parts by weight of hydroquinone are mixed, at 60° C., with 100 parts by weight of a 34% aqueous solution of formaldehyde and 3 parts by weight of calcium bicarbonate. Added to the resulting mixture, with stirring, are 80 parts by weight of sulfuric acid having a specific gravity of 1.52. 5 seconds after the components have been mixed, formation of a phenol foam plastic is completed.

Example 5

100 parts by weight of resorcinol are mixed, at 20° C., with 120 parts by weight of a 34% aqueous solution of formaldehyde, 3 parts by weight of polyhydroxy ethylene ester of isooctyl phenol, of the following formula: $C_8H_{17}-C_6H_4-O(CH_2CH_2O)_{n-1}-CH_2CH_2OH$, where $n=10$, and 3 parts by weight of ammonium carbonate. Added to the resulting mixture, with stirring, are 83 parts by weight of a 20% aqueous solution of sodium hydroxide. As a result of simultaneous polycondensation, foaming and curing, a phenol foam plastic is produced, whose formation is completed after 30 seconds.

Example 6

100 parts by weight of 5-methyl resorcinol are mixed with 90 parts by weight of a 40% aqueous solution of formaldehyde, 3 parts by weight of powdered aluminum, and 3 parts by weight of the surfactant of Example 1. Added to the resulting mixture, with stirring, are 80 parts by weight of a 20% aqueous solution of potassium hydroxide. After intensive stirring of the components, the process of formation of a phenol foam plastic is completed. It takes 60 seconds for the foam plastic to form.

Example 7

100 parts by weight of shale alkyl resorcinols (composition, in % by weight: 5-methyl resorcinol-46; 2,5-dimethyl resorcinol-12; 4,5-dimethyl resorcinol-12; 5- ethyl resorcinol-12; other alkyl resorcinols-18) are mixed, at 30° C., with 100 parts by weight of a 34% aqueous solution of formaldehyde and 3 parts by weight of calcium carbonate. Added to the resulting mixture, with stirring, are 45 parts by weight of sulfuric acid having a specific gravity of 1.09. After intensive stirring of the components, the process of formation of a phenol foam plastic is over. It takes 15 seconds for the foam plastic to form.

Example 8

100 parts by weight of shale alkyl resorcinols (composition, in % by weight: 5-methyl resorcinol-58; 2,5-dimethyl resorcinol-9; 4,5-dimethyl resorcinol-10; 5-ethyl resorcinol-10; other alkyl resorcinols-13) are mixed, at 20° C., with 100 parts by weight of a 34% aqueous solution of formaldehyde, 2 parts by weight of powdered aluminum, and 5 parts by weight of the surfactant of Example 1. Added to the resulting mixture, with stirring, are 45 parts by weight of phosphoric acid having a specific gravity of 1.08. As a result of mixing, a phenol foam plastic is obtained. It takes 40 seconds for the foam plastic to form.

Example 9

100 parts by weight of shale alkyl resorcinols (composition, in % by weight: 5-methyl resorcinol-50; 2,5-dimethyl resorcinol-10.5; 4,5-dimethyl resorcinol-12; 5-ethyl resorcinol-10.5; other alkyl resorcinols-17) are mixed, at 20° C., with 130 parts by weight of a 34% aqueous solution of formaldehyde and 10 parts by weight of a liquid foaming agent, namely, difluorodichloromethane. Added to the resulting mixture, with stirring, are 50 parts by weight of hydrochloric acid having a specific gravity of 1.09. As a result of simultaneous polycondensation, foaming and curing, a phenol foam plastic is obtained.

Example 10

100 parts by weight of shale alkyl resorcinols (composition, in % by weight: 5-methyl resorcinol-52; 2,5-dimethyl resorcinol-10.5; 4,5-dimethyl resorcinol-11; 5-ethyl resorcinol-11; other alkyl resorcinols-15.5) are mixed, at 25° C., with 80 parts by weight of a 40% aqueous solution of formaldehyde, 3 parts by weight of powdered aluminum, and 3 parts by weight of the surfactant of Example 5. Added to the resulting mixture, with stirring, are 85 parts by weight of a 20% aqueous solution of sodium hydroxide. As a result of simultaneous polycondensation, foaming and curing, a phenol foam plastic is obtained. It takes 45 seconds for the foam plastic to form.

Example 11

100 parts by weight of shale total phenols (composition, in % by weight: 5-methyl resorcinol-25.4; 4,5-dimethyl resorcinol-10.8; 5-ethyl resorcinol-9.5; 2,5-dimethyl resorcinol-7.0; monohydric phenols-3.0; resorcinol-2.6; 4-methyl resorcinol-2.0; 5-n-propyl resorcinol-1.8; 2-methyl resorcinol-1.4; 4,6-dimethyl resorcinol-1.0; 5-n-butyl resorcinol-0.7; other alkyl resorcinols-34.8) are mixed, at 10° C., with 80 parts by weight of a 34% aqueous solution of formaldehyde, 5 parts by weight of calcium carbonate, and 5 parts by weight of the surfactant of Example 1. Added to the resulting mixture, with stirring, are 40 parts by weight of sulfuric acid having a specific gravity of 1.18. As a result of simultaneous polycondensation, foaming and curing, a phenol foam plastic is produced. It takes 15 seconds for the foam plastic to form.

Example 12

100 parts by weight of shale total phenols (composition, in % by weight: 5-methyl resorcinol-29.4; 4,5-dimethyl resorcinol-8.0; 5-ethyl resorcinol-7.5; 2,5-dimethyl resorcinol-5.4; monohydric phenols-9.4; resorcinol-1.6; 4-methyl resorcinol-1.2; 5-n-propyl resorcinol-1.2; 2-methyl resorcinol-1.0; 4,6-dimethyl resorcinol-0.8; 5-n-butyl resorcinol-0.5; other alkyl resorcinols-34.0) are mixed, at 20° C., with 60 parts by weight of a 40% aqueous solution of formaldehyde and 3 parts by weight of powdered aluminum. Added to the resulting mixture, with stirring, are 50 parts by weight of phosphoric acid having a specific gravity of 1.19. As a result of simultaneous polycondensation, foaming and curing, a phenol foam plastic is obtained.

Example 13

100 parts by weight of shale total phenols (composition, in % by weight: 5-methyl resorcinol -27.4; 4,5-dimethyl resorcinol-9.4; 5-ethyl resorcinol-8.5; 2,5-dimethyl resorcinol-6.2; monohydric phenols-6.2; resorcinol-2.1; 4-methyl resorcinol-1.6; 5-n-propyl resorcinol-1.5; 2-methyl resorcinol-1.2; 4,6-dimethyl resorcinol-0.9; 5-n-butyl resorcinol-0.6; other alkyl resorcinols-34.4) are mixed, at 20° C., with 100 parts by weight of a 37% aqueous solution of formaldehyde and 4 parts by weight of ammonium carbonate. Added to the resulting mixture, with stirring, are 20 parts by weight of a 20% aqueous solution of sodium hydroxide. After mixing all of the above components, the processes of polycondensation, foaming and curing are conducted simultaneously to yield a phenol foam plastic.

Example 14

100 parts by weight of shale total phenols (composition, in % by weight: 5-methyl resorcinol-29.0; 4,5-dimethyl resorcinol-10.8; 5-ethyl resorcinol-9.5; 2,5-dimethyl resorcinol-6.8; monohydric phenols-1.0; resorcinol-2.3; 4-methyl resorcinol-1.7; 5-n-propyl resorcinol-1.6; 2-methyl resorcinol-1.3; 4,6-dimethyl resorcinol-1.0; 5-n-butyl resorcinol-0.7; other alkyl resorcinols-34.3) are mixed, at 20° C., with 120 parts by weight of a 34% aqueous solution of formaldehyde, 1.5 parts by weight of calcium carbonate, 3 parts by weight of the surfactant of Example 5, and 1 part by weight of powdered boron. Added to the resulting mixture, with stirring, are 20 parts by weight of sulfuric acid having a specific gravity of 1.12. After mixing all of the above components, the processes of polycondensation, foaming and curing are conducted simultaneously to yield a phenol foam plastic.

Example 15

100 parts by weight of shale total phenols of the composition of Example 12 are mixed, at 20° C., with 80 parts by weight of a 34% aqueous solution of formaldehyde, 2 parts by weight of calcium carbonate, and 5 parts by weight of powdered boron. Added to the resulting mixture, with stirring, are 20 parts by weight of sulfuric acid having a specific gravity of 1.12. After mixing all of the above components, the processes of polycondensation, foaming and curing are conducted simultaneously to yield a phenol foam plastic.

Example 16

100 parts by weight of shale total phenols of the composition of Example 11 are mixed with 100 parts by weight of a 34% aqueous solution of formaldehyde, 2 parts by weight of calcium carbonate, 2 parts by weight of the surfactant of Example 5, and 2.5 parts by weight of powdered boron. Added to the resulting mixture, with stirring, are 20 parts by weight of sulfuric acid having a specific gravity of 1.12. As a result, a phenol foam plastic is obtained.

Example 17

100 parts by weight of shale total phenols of the composition of Example 12 are mixed with 70 parts by weight of a 40% aqueous solution of formaldehyde, 3 parts by weight of calcium carbonate, and 1 part by weight of polyvinyl alcohol. Added to the resulting mixture, with stirring, are 30 parts by weight of sulfuric acid having a specific gravity of 1.12. As a result, a phenol foam plastic is obtained.

Example 18

100 parts by weight of shale total phenols of the composition of Example 13 are mixed with 200 parts by weight of a 40% aqueous solution of formaldehyde, 4 parts by weight of calcium carbonate, 3 parts by weight of the surfactant of Example 1, and 2 parts by weight of polyvinyl alcohol. Added to the resulting mixture, with stirring, are 40 parts by weight of sulfuric acid having a specific gravity of 1.12. After mixing all of the above components, the processes of polycondensation, foaming and curing are conducted simultaneously to yield a phenol foam plastic.

Example 19

100 parts by weight of shale total phenols of the composition of Example 13 are mixed with 100 parts by weight of a 34% aqueous solution of formaldehyde, 3 parts by weight of calcium carbonate, 3 parts by weight of the surfactant of Example 5, and 0.5 parts by weight of polyethylene glycol. Added to the resulting mixture, with stirring, are 30 parts by weight of sulfuric acid having a specific gravity of 1.12. As a result, a phenol foam plastic is obtained.

Example 20

100 parts by weight of shale total phenols of the composition of Example 11 are mixed with 150 parts by weight of a 40% aqueous solution of formaldehyde, 4 parts by weight of calcium carbonate, and 2.5 parts by weight of polyethylene glycol. Added to the resulting mixture, with stirring, are 40 parts by weight of sulfuric acid having a specific gravity of 1.12. As a result, a phenol foam plastic is obtained.

EXAMPLE 21

100 parts by weight of shale total phenols of the composition of Example 12 are mixed with 80 parts by weight of a 37% aqueous solution of formaldehyde, 3 parts by weight of calcium carbonate, 3 parts by weight of the surfactant of Example 1, and 1.5 parts by weight of polyethylene glycol. Added to the resulting mixture, with stirring, are 30 parts by weight of sulfuric acid having a specific gravity of 1.12. After mixing all of the above components, the processes of polycondensation, foaming and curing are conducted simultaneously to yield a phenol foam plastic.

Example 22

50 parts by weight of resorcinol and 50 parts by weight of 5-methyl resorcinol are mixed with 100 parts by weight of a 37% aqueous solution of formaldehyde and 3 parts by weight of calcium carbonate. Added to the resulting mixture, with stirring, are 30 parts by weight of sulfuric acid having a specific gravity of 1.14. After mixing all of the above components, the processes of polycondensation, foaming and curing are conducted simultaneously to yield a phenol foam plastic.

Example 23

30 parts by weight of pyrocatechol, 30 parts by weight of hydroquinone and 40 parts by weight of 5-methyl resorcinol are mixed with 120 parts by weight of a 40% aqueous solution of formaldehyde, 2 parts by weight of the surfactant of Example 1, 3 parts by weight of calcium carbonate, 2 parts by weight of powdered boron, and 1 part by weight of polyvinyl alcohol. Added to the resulting mixture, with stirring, are 40 parts by weight of sulfuric acid having a specific gravity of 1.12. After mixing all of the above components, the processes of polycondensation, foaming and curing are conducted simultaneously to yield a phenol foam plastic.

Example 24

For comparison, this example illustrates how a phenol foam plastic is obtained by the prior art method.

First, a liquid resol phenol-formaldehyde resin is obtained by way of polycondensation of phenol (94 parts by weight) with formaldehyde (130 parts by weight of a 37% aqueous solution) in the presence of 1.5 parts by weight of sodium hydroxide. The polycondensation is conducted at 75° to 80° C. for 2.5 to 3 hours.

The resulting product is neutralized with boric acid to a pH=7.0–7.3 and concentrated by distilling off water and volatile compounds under vacuum (ultimate pressure of 100 to 160 mm Hg) to a specific gravity of 1.24 g/cu.cm, at 20° C.

The obtained resol phenol-formaldehyde resin is mixed with 1.4 parts by weight of powdered aluminum, 4 parts by weight of the surfactant of Example 1, and added to the mixture are 17 parts by weight of the product of polycondensation of sulfophenol urea with formaldehyde and 42 parts by weight of orthophosphoric acid. 1.5 to 2 minutes after the components have been mixed, foaming and curing of the mixture start. As a result, a phenol foam plastic is obtained.

Table

| Example No. 1 | apparent density, kg/cu.m 2 | Stress at 10% linear compression strain kgf/sq.cm 3 | Ultimate bending strength, kgf/sq.cm 4 | Sorption moisture content after 24 hours of exposure to air with a relative humidity of 98 ± 2%, % by mass 5 | Water absorption during 24 hours, % by volume 6 | Heat-conductivity coefficient in a dry state at 20° ± 5° C., kcal/m.h. °C. 7 | Acid number, mgKOH/g 8 | pH of aqueous extract, g/100 ml H2O 9 |
|---|---|---|---|---|---|---|---|---|
| 1 | 80 | 1.4 | 2.0 | 12.0 | — | 0.033 | 25 | — |
| 2 | 70 | 0.8 | — | 10.0 | 24.0 | 0.033 | 60 | — |
| 3 | 100 | 4.0 | — | 5.0 | 26.0 | — | 25 | — |
| 4 | 100 | 0.6 | — | 15.0 | 16.2 | 0.037 | 80 | — |
| 5 | 75 | 5.0 | — | 9.3 | 30.0 | 0.033 | — | 6.9 |
| 6 | 75 | 2.4 | 3.0 | 14.5 | 34.5 | 0.033 | — | 9.7 |
| 7 | 60 | 1.4 | 1.7 | 10.0 | 18.0 | 0.032 | 25 | — |
| 8 | 60 | 1.4 | 1.7 | 10.0 | — | 0.032 | 25 | — |
| 9 | 60 | 1.3 | 1.5 | 10.0 | — | 0.032 | 25 | — |
| 10 | 70 | 2.8 | 3.2 | 24.0 | — | 0.033 | — | 9.7 |
| 11 | 50 | 1.0 | — | 12.0 | 12.0 | 0.031 | 30 | — |
| 12 | 50 | 1.0 | — | 12.0 | — | 0.031 | 30 | — |
| 13 | 75 | 2.8 | 3.0 | 8.6 | 14.7 | 0.033 | — | 8.3 |
| 14 | 95 | 6.0 | — | 4.0 | 12.0 | 0.037 | 25 | — |
| 15 | 100 | 3.4 | 3.6 | 4.2 | — | 0.037 | 25 | — |
| 16 | 100 | 6.3 | — | 4.3 | 14.5 | 0.037 | 25 | — |
| 17 | 55 | 2.0 | 2.7 | 1.9 | — | — | 25 | — |
| 18 | 70 | 3.1 | — | 2.0 | — | — | 25 | — |
| 19 | 80 | 5.3 | — | 1.0 | 5.7 | 0.035 | 25 | — |
| 20 | 73 | 3.7 | — | 1.9 | 4.6 | 0.035 | 25 | — |
| 21 | 75 | 3.7 | — | 1.9 | 4.1 | 0.035 | 25 | — |
| 22 | 80 | 4.5 | — | 10.0 | — | 0.035 | — | — |
| 23 | 100 | 5.5 | — | 4.8 | — | 0.037 | 30 | — |
| 24 | 75 | 1.3 | 1.7 | 22.0 | — | 0.037 | — | 4.5 |

What is claimed is:

1. A method for producing a phenol foam plastic, wherein polycondensation, foaming, and curing occur simultaneously, said method consisting essentially of mixing polycondensation of phenols selected from the group consisting of pyrocatechol, hydroquinone, resorcinol, 5-methyl resorcinol, shale alkyl resorcinols, shale total resorcinols, and various combinations thereof, with an aqueous formaldehyde solution in the presence of a foaming agent and a catalyst selected from the group consisting of acid and alkaline catalysts.

2. A method as claimed in claim 1, wherein shale alkyl resorcinols of the following composition (% by weight) are used:

| 5-methyl resorcinol | 46–58 |
|---|---|
| 2,5-dimethyl resorcinol | 9–12 |
| 4,5-dimethyl resorcinol | 10–12 |
| 5-ethyl resorcinol | 10–12 |
| other alkyl resorcinols | 13–18. |

3. A method as claimed in claim 1, wherein shale total resorcinols of the following composition (% by weight) are used:

| 5-methyl resorcinol | 25.4–29.4 |
|---|---|
| 4,5-dimethyl resorcinol | 8–10.8 |
| 5-ethyl resorcinol | 7.5–9.5 |
| 2,5-dimethyl resorcinol | 5.4–7.0 |
| monohydric phenols | 1.0–11.4 |
| resorcinol | 1.6–2.6 |
| 4-methyl resorcinol | 1.2–2.0 |
| 5-n-propyl resorcinol | 1.2–1.8 |
| 2-methyl resorcinol | 1.0–1.4 |
| 4,6-dimethyl resorcinol | 0.8–1.0 |
| 5-n-butyl resorcinol | 0.5–0.7 |
| other alkyl resorcinols | 34.0–34.8 |

4. A method as claimed in claim 1, wherein the polycondensation together with foaming and curing are conducted in the presence of a non-ionic surfactant taken in an amount of 1 to 5% of the weight of the starting phenols.

5. A method as claimed in claim 1, wherein the polycondensation together with foaming and curing are conducted in the presence of powdered boron taken in an amount of 1 to 5% of the weight of the starting phenols.

6. A method as claimed in claim 1, wherein the polycondensation together with foaming and curing are conducted in the presence of polyvinyl alcohol taken in an amount of 1 to 2% of the weight of the starting phenols.

7. A method as claimed in claim 1, wherein the polycondensation together with foaming and curing are conducted in the presence of polyethylene glycol taken in an amount of 0.5 to 2.5 of the weight of the starting phenols.

* * * * *